(12) United States Patent
Moeller

(10) Patent No.: US 6,261,623 B1
(45) Date of Patent: Jul. 17, 2001

(54) METHOD FOR MAKING A LIQUID SMOKE COLORING AGENT SOLUTION

(75) Inventor: Patrick W. Moeller, Brentwood, TN (US)

(73) Assignee: Hickory Specialties, Inc., Brentwood, TN (US)

( * ) Notice: Subject to any disclaimer, the term of this patent is extended or adjusted under 35 U.S.C. 154(b) by 0 days.

(21) Appl. No.: 09/422,907

(22) Filed: Oct. 21, 1999

(51) Int. Cl.[7] ............................. A23L 1/232; A23L 1/27
(52) U.S. Cl. ..................... 426/540; 426/135; 426/424; 426/650; 426/652
(58) Field of Search ........................ 426/135, 540, 426/650, 652, 422, 424

(56) References Cited

U.S. PATENT DOCUMENTS

| | | | |
|---|---|---|---|
| 4,104,408 | 8/1978 | Chiu | 426/135 |
| 4,154,866 | 5/1979 | Dainius et al. | 426/650 |
| 4,278,694 | 7/1981 | Chiu | 426/135 |
| 4,431,032 | 2/1984 | Nicholson | 138/118.1 |
| 4,442,868 | 4/1984 | Smith et al. | 138/118.1 |
| 4,446,167 | 5/1984 | Smith et al. | 426/650 |
| 4,504,507 | 3/1985 | Nicholson | 426/533 |
| 4,604,309 | 8/1986 | Goldberg | 428/36 |
| 4,751,097 | 6/1988 | Melcer | 426/650 |
| 4,834,993 | 5/1989 | Chiu | 426/250 |
| 4,889,751 | 12/1989 | Hansen et al. | 428/34.8 |
| 4,933,217 | 6/1990 | Chiu | 428/34.8 |
| 4,994,297 | 2/1991 | Underwood et al. | 426/650 |
| 5,030,464 | 7/1991 | Hansen et al. | 426/420 |
| 5,637,339 | 6/1997 | Moeller | 426/422 |
| 5,681,603 | 10/1997 | Underwood | 426/221 |
| 5,690,977 | 11/1997 | Hammer et al. | 426/105 |
| 5,840,362 | 11/1998 | Underwood et al. | 426/650 |

*Primary Examiner*—Arthur L. Corbin
(74) *Attorney, Agent, or Firm*—Jenkins & Wilson, P.A.

(57) ABSTRACT

A liquid smoke coloring agent solution having total water miscibility, a benzopyrene content under about 5 ppb, and a pH above about 11, and a related method for making same by contacting liquid smoke with water and an alkaline agent. The liquid smoke coloring agent solution may be made from commercially existing liquid smoke compositions.

8 Claims, No Drawings

METHOD FOR MAKING A LIQUID SMOKE COLORING AGENT SOLUTION

TECHNICAL FIELD

The present invention relates, in general, to a liquid smoke composition. Such liquid smoke compositions are used to color and flavor edible foodstuffs. More particularly, the present invention relates to a precipitate from a liquid smoke composition, which precipitate provides an improved coloring agent solution.

| Table of Abbreviations | |
|---|---|
| $NH_4OH$ | ammonium hydroxide |
| B(a)P | benzo(a)pyrene |
| $Ca(OH)_2$ | calcium hydroxide |
| C | Centigrade |
| F | Fahrenheit |
| g | gram |
| mg | milligram |
| ml | milliliter |
| ppb | parts per billion |
| PAH | polynuclear aromatic hydrocarbons |
| KOH | potassium hydroxide |
| NaOH | sodium hydroxide |

BACKGROUND OF THE INVENTION

Foods have been smoked, since humans first used fire to prepare meals, to provide flavor, color, and preservation. Initially, preservation was the ultimate reason to smoke foods, but as food preservation techniques advanced, flavor and color became the main reasons to smoke foods. As societies became more industrialized, the shift from home or individual smoking to processing in specialized plants led the need for improved control of smoking procedures, including consistent smoke application techniques.

Consequently, liquid smoke compositions (also known as liquid smoke solutions, and colloquially referred to as liquid smokes) were developed as a replacement for smoking of food by direct contact with smoke in a smokehouse. Such compositions have become a standard industry practice.

When applied to the surface of meats and other proteinaceous foodstuffs, such as various types of sausages, frankfurters, bolognas, beef rolls, hams, and the like, liquid smoke gives the item a characteristic smokey flavor and produces a dark smoked color. The achievement of a smokehouse-like product by application of an aqueous smoke solution to a foodstuff requires control and balancing of many variables such as the food composition, temperature, humidity, processing time, contact time, amount of liquid smoke, and concentration of liquid smoke.

It is well known to those skilled in the art that liquid smoke compositions contain a wide array of chemical compounds, and over 400 such compounds have been identified. Nevertheless, it is also well known to those skilled in the art that liquid smoke compositions are characterized by their content of certain classes of compounds, namely, acids (% titratable acidity), phenols, and carbonyls.

The acids are preservatives, and, of course, pH control agents, as a result of which commercial liquid smoke compositions typically have a pH under about 2.5, and more typically under about 2.3, and a % titratable acidity by volume from about 3% to about 18%. The phenols give flavor, and also aroma, to liquid smoke compositions, and commercial compositions typically have a phenols content from about 10 to about 45, and more typically, from about 14 to about 30 mg/ml. The carbonyls impart the brown color to liquid smoke compositions. The phenols and the carbonyls can be measured as described in the below-mentioned U.S. Pat. No. 4,431,032 to Nicholson. The browning potential of liquid smoke compositions can be measured by the well-known in the art Browning Index procedure described in the below-mentioned U.S. Pat. No. 4,994,297 to Underwood or by the well-known in the art Staining Index procedure involving reaction of liquid smoke with glycine. It is noted that the acids and carbonyls are secondary in contributing to the flavor of liquid smoke compositions. The color value can be measured as described in the below-mentioned U.S. Pat. No. 5,681,603 to Underwood. The '603 Patent to Underwood also describes how to measure B(a)P, which is carcinogenic and thus should be under 10 ppb.

As general background, improved liquid smoke compositions and techniques for their manufacture are described in U.S. Pat. No. 4,154,866 to Dainus, Dane, and O'Hara (assignee Stange Co.) and U.S. Pat. No. 4,994,297 to Underwood (assignee Ensyn Engineering Associates, Inc.).

As the advent of liquid smoke compositions has significantly improved meat processing, attempts have been made over the last 20 years or so to deal with the precipitate problem of liquid smoke. Upon storage of a liquid smoke product, the precipitate settles out forming a water insoluble, sticky, viscous residue on the bottom of the container for the liquid smoke.

Furthermore, even though liquid smoke is aqueous, liquid smoke is not totally water soluble, which exacerbates the precipitate problem. More specifically, the precipitate will occur upon dilution of liquid smoke with water.

Nevertheless, the precipitate can be kept in emulsion. For instance, U.S. Pat. No. 4,442,868 to Smith and Kearby (assignee Teepak) discloses the treatment of liquid smoke with alkaline agents to a pH of 10 or higher to dissolve precipitates so they stay in solution and to produce a coloring/flavoring agent for casing use. Moreover, not only does U.S. Pat. No. 4,446,167 to Smith and Kearby (assignee Teepak, Inc.) disclose the formation of a basic smoke flavorant/colorant from natural wood smoke, along with food casings and food products utilizing the flavorant/colorant, but also this U.S. patent is closely related to the disclosure of '868 to Smith and Kearby. Also, as described in U.S. Pat. No. 5,690,977 to Hammer, Mans, and Winter (assignee Hoechst AG), disclosed is a modified liquid smoke solution that contains an unmodified aqueous liquid smoke solution and an alkaline neutralizing agent. The composition also includes a synthetic or natural oil, a viscosity increasing component and one or more emulsifiers. The liquid smoke mixture is disclosed as containing the alkaline neutralizing agent in an amount such that the mixture has a pH of about 8 to about 14, and preferably of about 8.5 to about 12.

Alternatively, the precipitate can be removed, which may be achieved by a solvent extraction process used on liquid smoke to create a desirable tar-depleted liquid smoke supernatant fraction and an undesirable tar-containing fraction, followed by gravity separation of the two fractions, as is described in U.S. Pat. No. 4,431,032 to Nicholson (assignee Union Carbide Corporation). Also, U.S. Pat. No. 4,604,309 to Goldberg (assignee Teepak, Inc.) discloses a method for producing a liquid smoke solution which includes the step of neutralizing liquid smoke with a base such as sodium hydroxide to a pH of 6 to 7, which causes tar to precipitate. The precipitate is discarded. The aqueous portion can be extracted with organic solvents before or after treatment with the base. Furthermore, U.S. Pat. No. 4,834,993 to Chiu (assignee Viskase Corporation) discloses a liquid smoke solution that is prepared by precipitating tars via neutralizing an acidic liquid smoke composition followed by subsequent discarding of the tars. The neutralized liquid smoke composition preferably retains a pH of 5 to 9. Additionally, U.S. Pat. No. 5,637,339 to Moeller (assignee Hickory Specialties, Inc.) discloses treating liquid smoke with activated carbon particles to remove tars and create a tar-depleted liquid smoke that is totally water miscible.

Of more particular interest in relation to the present invention is the process of U.S. Pat. No. 4,278,694 to Chiu (assignee Union Carbide Corporation), which discloses methods for preparing aqueous liquid smoke compositions, including a concentrated aqueous liquid smoke composition. The concentrated aqueous liquid smoke composition is prepared by substantially neutralizing a liquid smoke solution containing smoke coloring and flavoring constituents to a pH of greater than about 4 with an alkaline neutralizing agent to form a precipitate of smoke tars. The smoke tars precipitate is then separated from the supernatant liquid and is then subsequently dissolved in a water soluble alcohol solubilizing agent to form a smoke tars liquid smoke composition having greater than about 15% by weight of dissolved smoke tars. The stated pH range for neutralized compositions is from about 4 to about 8. The precipitate is derived from a substantially unrefined liquid smoke source and thus includes a high concentration of tars, including high levels of undesirable components of tar, including benzo(a) pyrene, now known to be a carcinogen. An improvement is shown in the more recent U.S. Pat. No. 5,681,603 to Underwood (assignee Red Arrow Products). More specifically, Underwood discloses making a coloring/flavoring composition by contacting water insoluble tar by-product (from liquid smoke) with an alkaline solution to an end pH above 10. The tar solution is then contacted with certain non-ionic aromatic hydrocarbon-based resins to reduce the benzo(a)pyrene content to 10 ppb or less.

The disclosures of all of the above-mentioned patents are incorporated herein by reference.

Despite the above-discussed procedures to use the removed precipitate components of liquid smoke (such as using tar as described in '694 to Chiu and '603 to Underwood), nevertheless, problems still exist with such procedures. For instance, the process of '603 to Underwood has a shortfall in that the process includes a time-consuming contact step with the resin to remove the carcinogenic benzo(a)pyrene.

Thus, it is desirable to find an improved liquid smoke composition that is made from precipitate and a method for the manufacture thereof, which composition and method obviate the above-mentioned problems.

SUMMARY AND OBJECTS OF THE INVENTION

Accordingly, the present invention provides a method for making a liquid smoke coloring agent solution. The method comprises the step of contacting with water and an alkaline agent a starting-material liquid smoke composition. The starting-material liquid smoke composition includes an organic component, which will fall out as an organic precipitate when the starting-material liquid smoke composition is contacted with water. The contacting with water and an alkaline agent produces a liquid smoke coloring agent solution that has an alkaline pH above about 11, that is totally water miscible, and that possesses a benzo(a)pyrene content less than about 5 parts per billion free of treatment of the liquid smoke coloring agent solution for benzo(a)pyrene removal.

Additionally, the present invention provides for a liquid smoke coloring agent solution comprising a totally water-miscible liquid smoke coloring agent solution, which (i) possesses a benzo(a)pyrene content less than about 5 parts per billion absent treatment for removal of benzo(a)pyrene, (ii) has a pH above about 11, and (iii) is derived from a starting-material liquid smoke composition containing an organic component, wherein the organic component will fall out as an organic precipitate from contacting the starting-material liquid smoke composition with water.

Preferably, the final liquid smoke coloring agent solution has a phenols content above about 35 mg/ml and/or a color value above about 500.

The present invention also contemplates a food casing treated with the liquid smoke coloring agent solution. The treatment may be by spraying the solution onto a surface of the casing, or in the event that the casing is of extruded polymeric plastic film, the solution may be sprayed onto a surface of the film or may be incorporated into the extruder with the polymeric resin beads and thus blended into the resultant plastic film.

The present invention also contemplates a proteinaceous foodstuff, such as various types of sausages, frankfurters, bolognas, beef rolls, hams, and the like, treated with the novel liquid smoke coloring agent solution.

Accordingly, it is an object of the present invention to provide a liquid smoke coloring agent solution and related method of manufacture, wherein the solution will not form tar precipitate upon dilution with water.

Hence, it is an advantage of the present invention that the liquid smoke coloring agent solution is totally water miscible since when it is applied to foodstuffs or food casings it may be diluted with water but will not form tar precipitates that gum the piping system of the application apparatus.

It is a further advantage that the liquid smoke coloring agent solution of the present invention is extremely low in B(a)P and thus is not carcinogenic, absent treatment for removal of B(a)P.

Some of the objects and advantages of the invention having been stated above, other objects, as well as other advantages, will become evident as the description proceeds, when taken in connection with the Laboratory Examples and detailed description below.

DETAILED DESCRIPTION OF THE INVENTION

Traditionally, the water-insoluble precipitate, after isolation from the liquid smoke composition, is discarded. As demonstrated hereafter, the present invention is directed to a method of preparing a smoke coloring and flavoring from this water-insoluble precipitate, thereby providing a commercially useful product and substantially reducing the volume of discarded precipitate.

The present invention is directed to a liquid smoke coloring agent solution manufactured by contacting a starting-material liquid smoke composition with water to cause an organic component of the starting-material liquid smoke composition to precipitate out. Then, the pH of the organic precipitate is adjusted to above about 11.0, more preferably about 11.4 or more, and even more preferably about 11.8 or more, with an alkaline agent (such as NaOH, KOH, $Ca(OH)_2$, or $NH_4OH$), resulting in a liquid smoke coloring agent solution. Optionally, a portion of the alkaline agent may be added to the liquid smoke composition prior to the addition of the water, as further explained below. The resultant liquid smoke coloring agent solution of the invention has a low B(a)P under about 5 ppb, more preferably under about 3 ppb, and even more preferably under about 1 ppb, free of any treatment of the resultant liquid smoke coloring agent solution to remove B(a)Ps. Moreover, the resultant liquid smoke coloring agent solution of the invention possesses excellent color capability as well as flavoring capability.

As is well known, water-insoluble precipitates from liquid smoke compositions typically contain in excess of 100 ppb of B(a)P. Many polynuclear aromatic hydrocarbon compounds, including B(a)P, are known carcinogens. Thus, up to now, it was important to reduce the PAH content of any composition (made from precipitate and used to contact a foodstuff) as much as possible. Specifically it was important to reduce the concentration of B(a)P, which is known as a potent carcinogen, to about 10 ppb or less, and preferably to about 1 ppb or less, but such treatment is unnecessary with the present invention.

In the Laboratory Examples below, in order to produce a liquid smoke coloring agent solution, a liquid smoke composition (containing an organic component that precipitates out from contact with water) treated by the method of the present invention was Code 10 as the starting material. Code 10 is commercially available from Hickory Specialties, Inc., of Brentwood, Tenn. Additionally, the liquid smoke composition starting material employed may be SUPERSMOKE, also commercially available form Hickory Specialties, Inc., and manufactured by a well known vacuum evaporation process that concentrates Code 10 by removing some of the water from Code 10. As a result, SUPERSMOKE has a typical acidity of about 16%, whereas Code 10 has a typical acidity of about 11%. Other commercially available liquid smoke compositions also may be employed as the starting material with the method of the present invention to produce a liquid smoke coloring agent solution, as long as the starting-material liquid smoke composition is not totally miscible with water (i.e., a precipitate falls out when water is added), and has a low B(a)P under about 10, more preferably under about 5, and even more preferably under about 1 ppb. Moreover, as can be seen from the Laboratory Examples below, the inventive method produced a resultant liquid smoke coloring agent solution and when the resultant was then diluted with water, no tar precipitated. Thus, the resultant was totally miscible with water.

With the present invention, the contact of the starting-material liquid smoke composition with water and the alkaline agent in order to produce a liquid smoke coloring agent solution should be under ambient conditions of temperature and pressure. Furthermore, the time of contact is not particularly long, and depending on the particular type and amount of ingredients, the contact time only needs to be sufficient to cause the organic precipitate to fall out and then go into aqueous solution.

Batch processes, wherein the liquid smoke composition is placed in a container with stirring, followed by filtration to separate the organic precipitate from the liquid smoke composition, may be employed. Besides filtration, the method to separate the organic precipitate may include gravity decanting, liquid cycloning, and centrifugal decanting.

The resultant liquid smoke coloring agent solution of the present invention typically has a phenols content (indicative of flavor) of at least about 35, more preferably at least about 40, and even more preferably about 45 or more mg/ml, and a color value of at least about 500, more preferably at least about 600, and most preferably about 650 or more.

Additionally, food casings may be treated with the liquid smoke coloring agent solution. In the event that the casing is the fibrous type, the treatment may be by spraying the solution onto a surface of the casing. Typical fibrous casings are cellulosic in nature. In the event that the casing is of extruded polymeric plastic film, the solution may be sprayed onto the surface of the film. Alternatively, the solution may be incorporated into the extruder with the polymeric resins beads and thus blended into the resultant plastic film. Typical polymeric plastic films include, but are not limited to, films of polymers selected from the group consisting of ethylene vinyl acetate, ethylene acrylic acid, ethylene methacrylic acid, linear low density polyethylene, very low density linear low density polyethylene (sometimes referred to as ultra low density polyethylene), and combinations of the polymers.

Additionally, a proteinaceous foodstuff may be treated with the liquid smoke coloring agent solution, such as by spraying on the surface of the proteinaceous foodstuff. Examples of various types of proteinaceous foodstuffs include, but are not limited to, sausages, frankfurters, bolognas, beef rolls, hams, and combinations of the proteinaceous foodstuffs.

Laboratory Examples

In the Laboratory Examples below, the methods used to determine the phenols and the carbonyls are well known to those skilled in the art and are set out at columns 11 and 12 in the above-mentioned U.S. Pat. No. 4,431,032 to Nicholson. Furthermore, in the Laboratory Examples below, the methods used to determine the ppb of B(a)P and the color are well known to those skilled in the art and are set out, respectively, at columns 7 and 8 and at column 20 in the above-mentioned U.S. Pat. No. 5,681,603 to Underwood. Also, in the Laboratory Examples below, the methods used to determine the staining index and the acid percent are well known to those skilled in the art, and are set out as follows:

Staining Index

Reagent of 2.5% Glycine in 95% Acetic Acid. Slurry 2.50 gram of glycine (Eastman #445) with 5.0 ml distilled water in a 150 ml beaker. Add about 70 ml glacial acetic and heat on a steam bath, stirring occasionally to dissolve the glycine. Transfer to a 100 ml volumetric flask, cool to room temperature, and make to volume with glacial acetic acid which is used to rise the original beaker. Filter the solution prior to use if any glycine crystallizes out. The solution is stable for at least 3 weeks, and probably indefinitely.

5% Liquid Smoke Solution. Dilute 2.50 ml of liquid smoke to 50.0 ml with glacial acetic acid.

Reaction

1. Using two 25 ml graduated test tubes, add 1.0 ml of the 5% liquid smoke solution to 10.0 ml of glycine reagent and add 1.0 ml of the 5% liquid smoke solution to 10 ml of glacial acetic acid (blank).
2. Cover each tightly with a square of parafilm, and mix by swirling and place in a water bath at 85° C. for 30 minutes.
3. Transfer each to a cold water bath and dilute partially with distilled water to speed cooling. When each is at room temperature, finish diluting each to the 25 ml mark and mix by inversion.

4. Set a spectrophotometer to 0 using distilled water. Read the absorbance of each solution in a 0.5 inch cuvette using a spectrophotometer at 440 millimicrons.
5. Calculate the net absorbance by subtracting the reading of the blank (consisting of 1.0 ml of 5% liquid smoke solution, 10.0 ml glacial acetic acid, and distilled water to 25 ml) from the reading of the test sample.
6. Calculate the staining index: SI=Net Absorbance×100.

Percentage of Acetic Acid

Pour 250 ml of distilled water into a clean 400 ml beaker. Introduce 6 ml of liquid smoke. Standardize pH meter with pH 7 buffer solution. The pH meter should be on 7.00. If not, use control knob and place it there. Rinse off glass electrode with distilled water from spray bottle. Place beaker of water-smoke mixture on testing platform, and lower pH electrodes. Stir mixture, adding in standard 1.0 Normality sodium hydroxide solution. Add the sodium hydroxide until pH meter reads 7.00. The amount of milliliters of sodium hydroxide put into the water-smoke mixture is the percentage of acetic acid. For instance, 1 ml of sodium hydroxide entering into the smoke-water mixture will count 1 point acetic acid until the pH meter reaches a value of 7.00. In other words, if 9.4 ml of 1.0 N NaOH solution is introduced, the acetic acid reading will be 9.4% of acetic acid by volume. The calculations are as follows:

% acetic acid=[(ml of NaOH)×(Normality of NaOH)×0.1 (correction to %)×(equivalent weight of acetic acid)] divided by ml of liquid smoke. % acetic acid=[(9.4 ml of NaOH)×(1.0 Normality)×(approximately 60)] divided by 6.0 ml of liquid smoke, and thus, % acetic acid=9.4.

It is noted that some information was not taken in early tests since it was not typical of the type of product involved. The acidity and carbonyls cannot be measured or have no meaning in an alkaline environment. The color test is not run on low pH (acidic) smoke products since they are tested for stain index values.

EXAMPLE 1

A liquid smoke composition having a titratable acidity of 10.8% (Code 10 from Hickory Specialties,Inc.) was placed in a container and mixed with water to a titratable acidity of 3.0%. The addition of water caused an organic fraction to precipitate and settle to the bottom of the container. (During this 1st test and repeats, the amount of precipitate ranged from 3 to 15% by weight of the original amount of Code 10.) An aliquot of the precipitate was mixed with 50% NaOH and the reaction temperature was raised to 150° F. (65.6° C.). Then, the mixture was diluted with additional water to a final water content of 50% for viscosity control. The final coloring agent solution had a pH of 12 and is designated in Table 1 below as the 1st sample.

A second sample was prepared in a manner similar to the first sample. However, in this sample, the additional dilution water was added before the addition of NaOH, and also, the temperature was held below 125° F. (51.6°C.).

The final coloring agent solution is designated in Table 1 below as the 2nd sample.

The procedure of the second sample was repeated but the reaction temperature was raised to 160° F. (71° C). The final coloring agent solution is designated in Table 1 below as the 3rd sample.

TABLE 1

| Sample | (%) Acidity | pH | Color | Carbonyls (g/100 g) | Phenols (mg/ml) | (%) Water Dilution | B(a)P (ppb) |
|---|---|---|---|---|---|---|---|
| Code 10 (starting material) | 10.8 | 2.1 | ** | 18 | 17 | — | 0.5 |
| 1st | — | 12 | 656 | — | — | 50 | <1 |
| 2nd | — | 12 | 650 | — | — | 50 | — |
| 3rd | — | 12 | 697 | — | 45 | 50 | — |

**Instead of color, stain index was determined to be 85.

EXAMPLE 2

A liquid smoke composition having a titratable acidity of 11.0% (Code 10 from Hickory Specialties, Inc.) was placed in a container and treated with 50% NaOH until the pH was 6.0. The addition of NaOH caused an organic precipitate to form, which settled to the bottom of the container. An aliquot of the precipitate (38.8 g) was mixed with 17.5 ml of 25% NaOH solution. Then, 17.5 ml of dilution water was added to adjust viscosity. The final coloring agent solution had a pH of 12 and is designated in Table 2 below as the 1st sample.

TABLE 2

| Sample | (%) Acidity | pH | Color | Carbonyls (g/100 g) | Phenols (mg/ml) | (%) Water Dilution | B(a)P (ppb) |
|---|---|---|---|---|---|---|---|
| Code 10 (starting material) | 11.0 | 2.1 | ** | 19 | 17.5 | — | 0.5 |
| 1st | — | 11.8 | 673 | — | — | 49.8 | 0.8 |

**Instead of color, stain index was determined to be 85.

EXAMPLE 3

The procedure of Example 1 may be repeated but with SUPERSMOKE instead of Code 10. The results should be as reported in the following Table 3.

TABLE 3

| Sample | (%) Acidity | pH | Color | Carbonyls (g/100 g) | Phenols (mg/ml) | (%) Water Dilution | B(a)P (ppb) |
|---|---|---|---|---|---|---|---|
| SUPER-SMOKE (starting material) | 16.0 | 2.0 | ** | 37 | 38 | — | 0.8 |
| 1st | — | 12 | 690 | — | — | 50 | <1 |

**Instead of color, stain index was determined to be 180.

EXAMPLE 4 (TREATMENT OF FOODSTUFFS)

Various proteinaceous foodstuffs may be treated with the liquid smoke coloring agent solutions from Example 1 (samples 1 through 3) and Example 2 (sample 1).

The foodstuffs that may be treated by applying each of the liquid smoke coloring agent solutions to the surface of the foodstuffs are sausages, frankfurters, bolognas, beef rolls, and hams.

Excellent color and flavor should be obtained.

EXAMPLE 5 (TREATMENT OF FOOD CASINGS)

Food casings may be treated with the liquid smoke coloring agent solutions from Example 1(samples 1 through 3) and Example 2 (sample 1).

Selected casings may be cellulosic fibrous casings and may be treated by individually spraying each liquid smoke coloring agent solution onto the surface of each respective casing.

Selected casings may be extruded polymeric plastic films and may be treated by individually spraying each liquid smoke coloring agent solution onto the surface of each respective casing.

Selected casings may be extruded polymeric plastic films and may be treated by individually incorporating each liquid smoke coloring agent solution with each respective kind of polymeric resin beads and thus blending each of the solutions into each of the resultant films.

The polymeric plastic films may be of ethylene vinyl acetate, ethylene acrylic acid, ethylene methacrylic acid, linear low density polyethylene, very low density linear low density polyethylene, and combinations thereof.

The same foodstuffs (either treated or untreated) as recited in Example 4 may be packaged with the various treated casings, and the packaged foodstuffs should have excellent color and flavor.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for making a liquid smoke coloring agent solution comprising the step of contacting with water and an alkaline agent a starting-material liquid smoke composition having a benzo(a)pyrene content of under about 10 parts per billion and including an organic component, which will fall out as an organic precipitate when the starting-material liquid smoke composition is contacted with water, to produce from the organic precipitate a liquid smoke coloring agent solution that (a) has an alkaline pH above about 11, (b) is totally water miscible, and (c) possesses a benzo(a)pyrene content less than about 5 parts per billion without treatment of the liquid smoke coloring agent solution for removal of benzo(a)pyrene.

2. The method of claim 1, wherein the pH is above about 11.4.

3. The method of claim 2, wherein the starting-material liquid smoke composition has a benzo(a)pyrene content under about 5 parts per billion.

4. The method of claim 1, wherein the liquid smoke coloring agent solution possesses a color value above about 500.

5. The method of claim 4, wherein the liquid smoke coloring agent solution possesses a color value above about 600.

6. The method of claim 5, wherein the liquid smoke coloring agent solution possesses a phenols content, indicative of flavor, above about 40 mg/ml.

7. The method of claim 1, wherein the liquid smoke coloring agent solution possesses a phenols content, indicative of flavor, above about 35 mg/ml.

8. The method of claim 1, wherein the alkaline agent is selected from the group consisting of sodium hydroxide, potassium hydroxide, calcium hydroxide, ammonium hydroxide, and combinations thereof.

* * * * *